(12) United States Patent
Diephuis et al.

(10) Patent No.: US 11,897,428 B2
(45) Date of Patent: Feb. 13, 2024

(54) INTERIOR SYSTEM OF A VEHICLE

(71) Applicant: Ford Global Technologies, LLC, Dearborn, MI (US)

(72) Inventors: Jesse Rene Diephuis, West Bloomfield, MI (US); Michael John Harmon, Westland, MI (US); Andrew Brand, Bloomfield Township, MI (US); Ryan Wayne Warner, Ann Arbor, MI (US); Andrew Smith, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 17/501,385

(22) Filed: Oct. 14, 2021

(65) Prior Publication Data
US 2023/0118558 A1   Apr. 20, 2023

(51) Int. Cl.
*B60R 7/04* (2006.01)

(52) U.S. Cl.
CPC ..................... *B60R 7/04* (2013.01)

(58) Field of Classification Search
CPC ................. B60R 7/04; B60R 7/043
USPC ...................................... 296/37.13
See application file for complete search history.

(56) References Cited

U.S. PATENT DOCUMENTS

| | | | | |
|---|---|---|---|---|
| 5,358,307 | A * | 10/1994 | Shafer | B60R 7/043 297/188.21 |
| 6,568,743 | B1 * | 5/2003 | Jayasuriya | B60N 2/78 296/153 |
| 7,753,424 | B2 * | 7/2010 | Sommer | B60N 2/78 296/153 |
| 9,216,675 | B2 * | 12/2015 | Jayasuriya | B60R 13/0243 |
| 10,351,022 | B1 * | 7/2019 | Dry | B60N 2/01 |
| 10,457,178 | B2 * | 10/2019 | Shimizu | B60Q 3/217 |
| 10,926,663 | B2 * | 2/2021 | Tippy | B60N 2/143 |
| 2004/0164577 | A1 * | 8/2004 | Shabana | B60N 2/02246 296/1.09 |
| 2007/0063004 | A1 | 3/2007 | Weinberg et al. | |
| 2009/0079228 | A1 * | 3/2009 | Sturt | B60N 2/793 296/153 |
| 2010/0147861 | A1 | 6/2010 | Andochick | |
| 2017/0267183 | A1 * | 9/2017 | Catlin | B60R 7/04 |
| 2019/0111850 | A1 * | 4/2019 | Vanel | B60R 7/04 |

FOREIGN PATENT DOCUMENTS

FR          3117092 A1 *  6/2022

* cited by examiner

*Primary Examiner* — Pinel E Romain
(74) *Attorney, Agent, or Firm* — Vichit Chea; Price Heneveld LLP

(57) ABSTRACT

An interior system for a vehicle includes a seating assembly that is coupled to the vehicle. An armrest corresponding with and in a spaced-relationship with the seating assembly is operable to translate in a seating assembly-lateral direction from a first position to a second position. In the first position of the armrest, the armrest is a first distance from the seating assembly. In the second position of the armrest, the armrest is a second distance from the seating assembly. The first distance is greater than the second distance.

20 Claims, 10 Drawing Sheets

INTERIOR SYSTEM OF A VEHICLE

FIELD OF THE DISCLOSURE

The present disclosure generally relates to an interior system for a vehicle. More specifically, the present disclosure relates to an interior system for a vehicle that includes an armrest.

BACKGROUND OF THE DISCLOSURE

Vehicles typically include seating assemblies with attached armrests.

SUMMARY OF THE DISCLOSURE

According to a first aspect of the present disclosure, an interior system for a vehicle includes a seating assembly coupled to the vehicle and an armrest corresponding with and in a spaced-relationship with the seating assembly and operable to translate in a seating assembly-lateral direction from a first position to a second position. In the first position, the armrest is a first distance from the seating assembly. In the second position, the armrest is a second distance from the seating assembly. The first distance is greater than the second distance.

Embodiments of the first aspect of the present disclosure can include any one or a combination of the following features:
- a support structure coupled to at least one of a door of the vehicle and an interior wall of the vehicle at a position vehicle-upward of a floor of the vehicle, wherein the armrest is translatably coupled to the support structure and operable to translate relative to the support structure between the first and second positions;
- the support structure includes a receptacle that defines a storage area;
- the armrest is positioned beneath the receptacle in the first position;
- the armrest includes a storage compartment and a lid operably coupled to the storage compartment and pivotable between an open position, wherein access to the storage compartment is provided, and a closed position, wherein the lid covers an opening to the storage compartment;
- the support structure interferes with a pivot path of the lid in the first position of the armrest; and
- the lid is operable to pivot between the open and closed positions about a lid pivot axis that extends substantially seating assembly-longitudinally.

According to a second aspect of the present disclosure, an interior system for a vehicle includes a first seating assembly coupled to the vehicle and a second seating assembly coupled to the vehicle. The interior system also includes a first armrest corresponding with and in a spaced-relationship with the first seating assembly and operable to translate in a first seating assembly-lateral direction from a first position to a second position. In the first position, the armrest is a first distance from the first seating assembly. In the second position, the armrest is a second distance from the first seating assembly. The first distance is greater than the second distance. The interior system further includes a second armrest corresponding with and in a spaced-relationship with the second seating assembly and operable to pivot from a stowed position to a use position about a substantially vehicle-vertical pivot axis.

Embodiments of the second aspect of the present disclosure can include any one or a combination of the following features:
- a majority of the first armrest is positioned beneath the second armrest in a condition of the interior system, wherein the first armrest is in the first position and the second armrest is in the stowed position;
- the first armrest includes a first armrest distal end and a first armrest proximal end, wherein the first armrest extends from the first armrest proximal end to the first armrest distal end away from a first seatback of the first seating assembly along a length of the first armrest that is substantially perpendicular to the first seating assembly-lateral direction;
- the second armrest includes a second armrest distal end and a second armrest proximal end, wherein the second armrest extends from the second armrest proximal end to the second armrest distal end away from a second seatback of the second seating assembly along a length of the second armrest, wherein the length of the second armrest is substantially parallel to a second seating assembly-lateral direction in the stowed position of the second armrest, and the length of the second armrest is substantially perpendicular to the second seating assembly-lateral direction in the use position of the second armrest;
- the length of the first armrest is substantially parallel to the length of the second armrest in the stowed position of the second armrest;
- the first seating assembly faces a first vehicle-direction, the second seating assembly faces a second vehicle-direction, and the first vehicle-direction is substantially perpendicular to the second vehicle-direction;
- a receptacle positioned within the vehicle, such that, in a condition of the interior system wherein the first armrest is in the first position and the second armrest is in the stowed position, the second armrest is positioned beneath the receptacle and the first armrest is positioned beneath the receptacle and the second armrest;
- the first armrest includes a storage compartment and a lid operably coupled to the storage compartment and pivotable between an open position, wherein access to the storage compartment is provided, and a closed position, wherein the lid covers an opening to the storage compartment; and
- a support structure coupled to the vehicle, wherein the first armrest is translatably coupled to the support structure, and the support structure interferes with a pivot path of the lid in the first position of the first armrest.

According to a third aspect of the present disclosure, an interior system for a vehicle includes a support structure coupled to at least one of a door of the vehicle and an interior wall of the vehicle at a position vehicle-upward of a floor of the vehicle. The interior system further includes an armrest in a spaced-relationship with a corresponding seating assembly of the vehicle, translatably coupled to the support structure, and operable to translate relative to the support structure from a first position to a second position. In the first position, the armrest is positioned beneath the support structure.

Embodiments of a third aspect of the present disclosure can include any one or a combination of the following features:
- the armrest translates in a seating assembly-lateral direction from the first position to the second position;

the armrest is a first distance from the seating assembly in the first position and a second distance from the seating assembly in the second position, and wherein the first distance is greater than the second distance; and the support structure includes an open-topped receptacle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
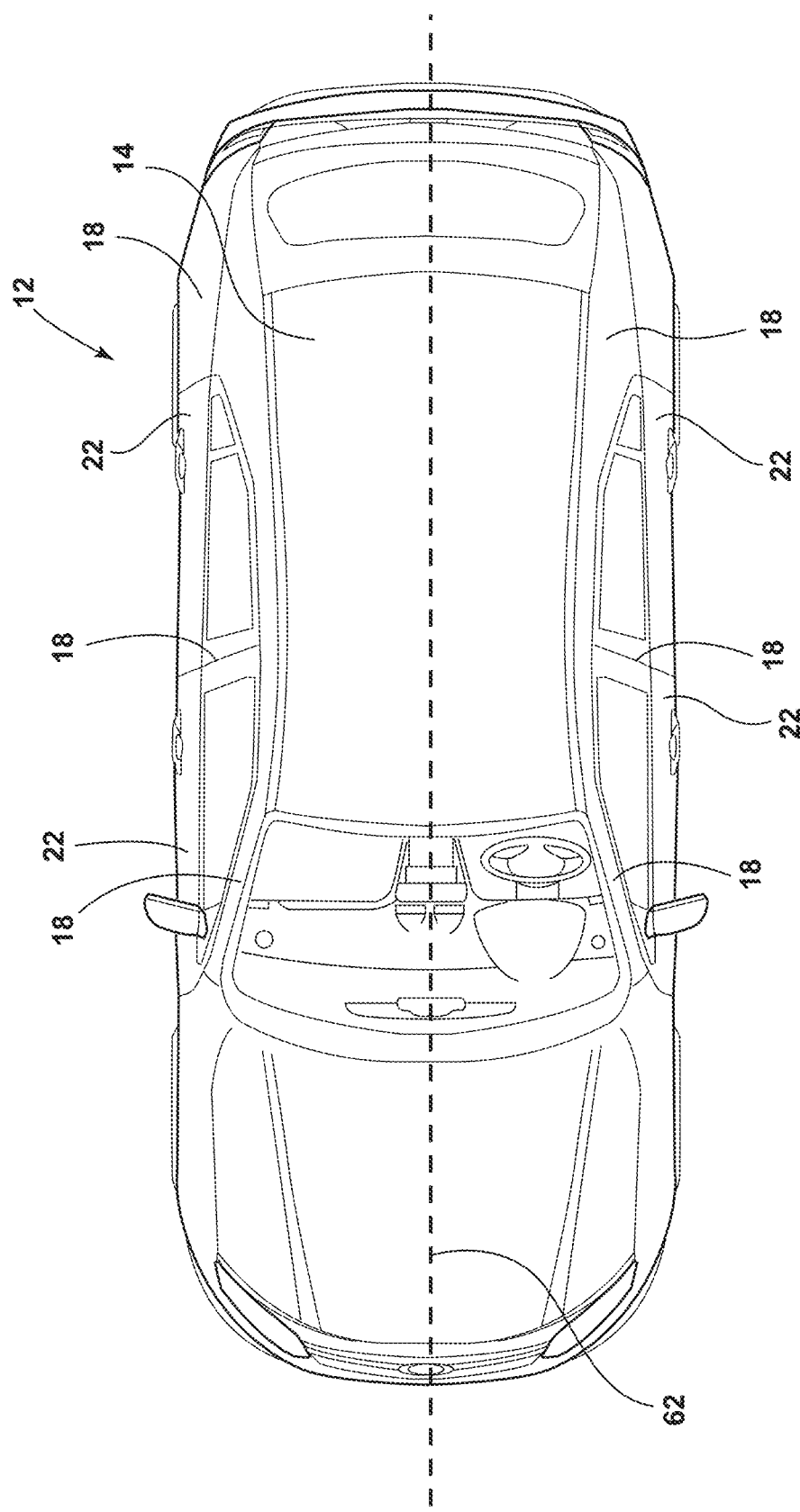
FIG. 1 is a plan view of a vehicle, according to one embodiment.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-10, an interior system 10 for a vehicle 12 includes a seating assembly 26 that is coupled to the vehicle 12. An armrest 32 corresponding with and in a spaced-relationship with the seating assembly 26 is operable to translate in a seating assembly-lateral direction from a first position to a second position. In the first position of the armrest 32, the armrest 32 is a first distance from the seating assembly 26. In the second position of the armrest 32, the armrest 32 is a second distance from the seating assembly 26. The first distance is greater than the second distance.

Figure 2:
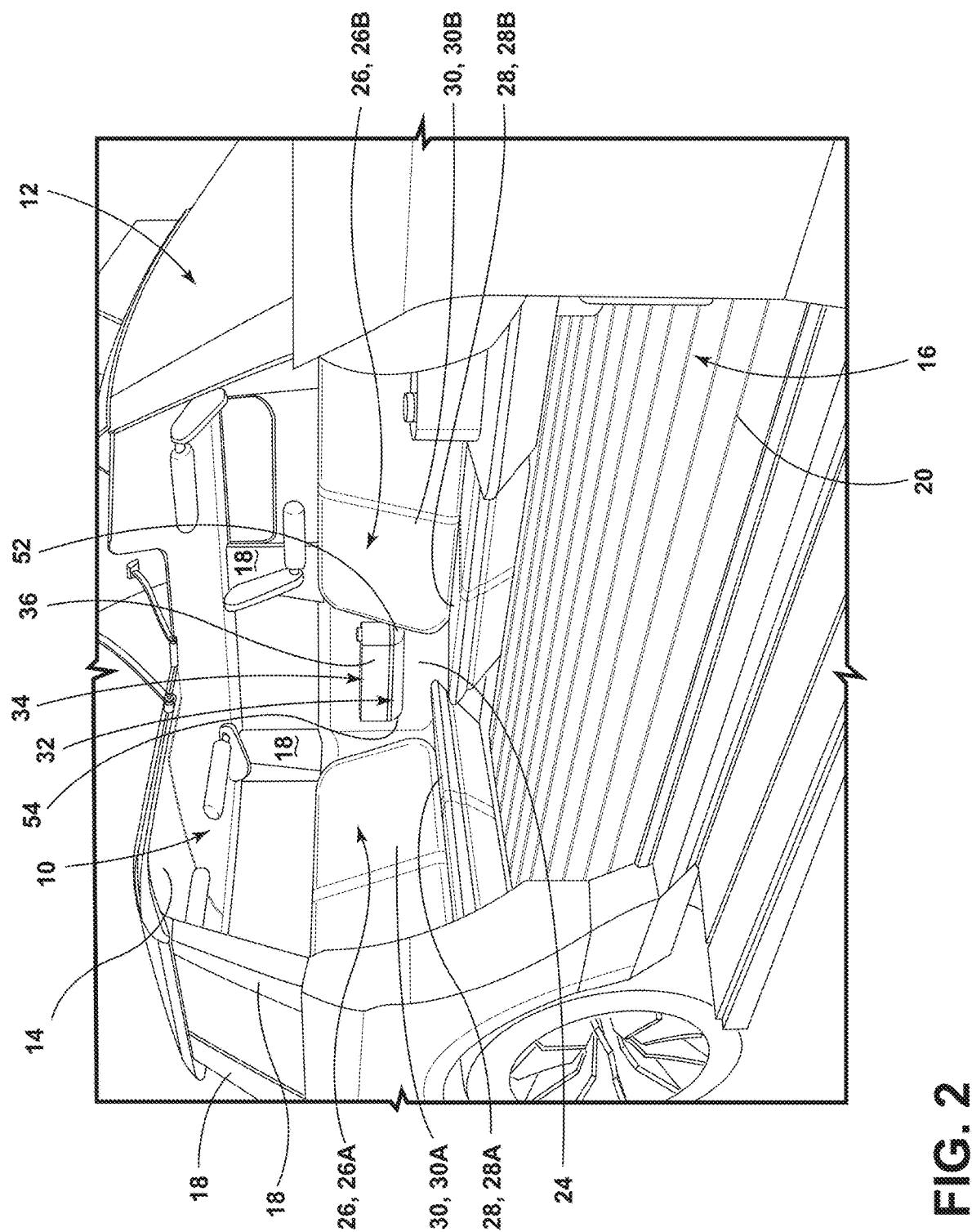
FIG. 2 is a side perspective view of the vehicle, illustrating a vehicle interior that includes first and second seating assemblies and an armrest coupled to a support structure, according to one embodiment.

Referring now to FIGS. 1 and 2, the vehicle 12 includes a roof 14 and a vehicle interior 16. The vehicle interior 16 may be vehicle-downward of the roof 14. As illustrated in FIG. 1, a plurality of pillars 18 of the vehicle 12 (e.g., A pillar, B pillar, etc.) may extend vehicle-downward from the roof 14 of the vehicle 12. The vehicle 12 includes a floor 20 that is vehicle-downward of the roof 14, as illustrated in FIG. 2. The vehicle 12 may include a door 22. In some embodiments, the vehicle 12 may include a plurality of doors 22. The door 22 may include an interior door surface that is in communication with the vehicle interior 16 of the vehicle 12. As illustrated in FIG. 2, the vehicle 12 may include an interior wall 24. The interior wall 24 may be in communication with the vehicle interior 16. The interior wall 24 of the vehicle 12 may be positioned between the floor 20 of the vehicle 12 and the roof 14 of the vehicle 12.

Figure 3:
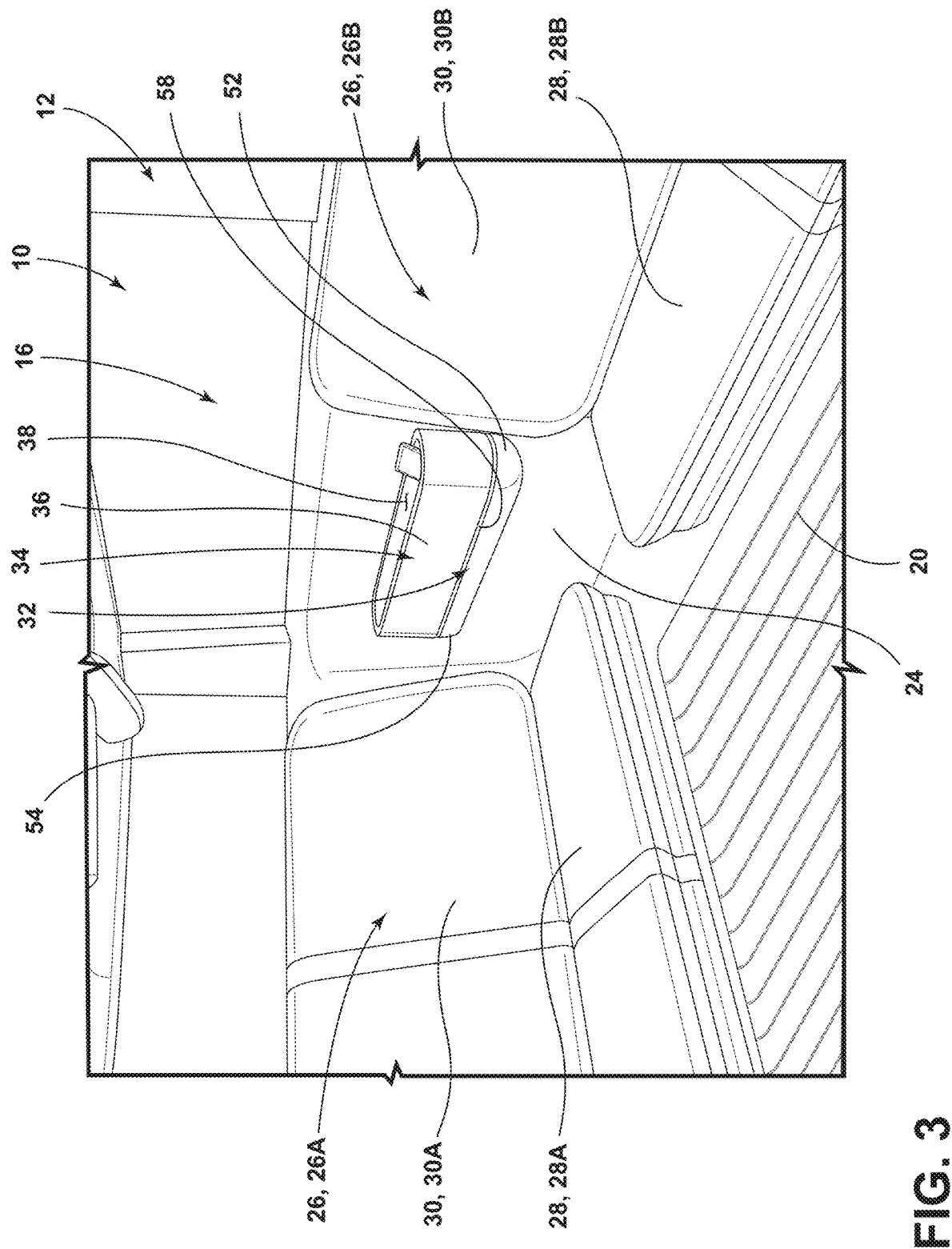
FIG. 3 is a perspective view of the vehicle interior, illustrating the armrest in a first position beneath the support structure, according to one embodiment.
Figure 4:
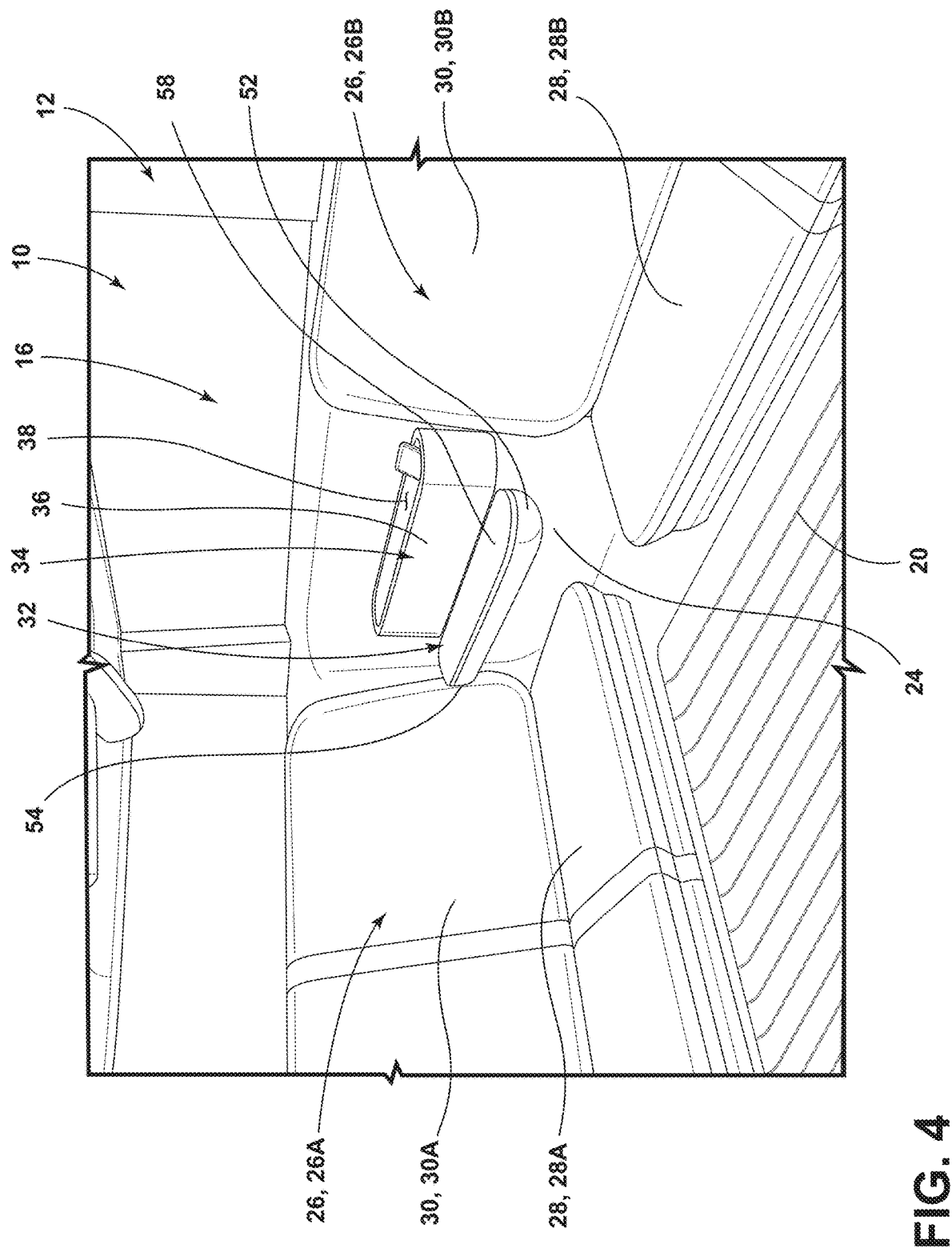
FIG. 4 is a perspective view of the vehicle interior, illustrating the armrest in a second position, according to one embodiment.

Referring now to FIGS. 2-5, the vehicle 12 may include a seating assembly 26. The seating assembly 26 may include a seat base 28 and a seatback 30. The seatback 30 may be coupled to the seat base 28, as illustrated in FIGS. 2 and 3. In various embodiments, the vehicle 12 may include a plurality of seating assemblies 26. For example, as illustrated in FIGS. 2-5, the vehicle 12 includes a first seating assembly 26A having a first seat base 28A and a first seatback 30A and a second seating assembly 26B having a second seat base 28B and a second seatback 30B. The roof 14 may be positioned vehicle-upward of the first and second seating assemblies 26A, 26B, in various embodiments. The seating assembly 26 of the vehicle 12 is configured to accommodate at least one seated user. In some embodiments, the seating assembly 26 may be configured to accommodate a plurality of seated users. For example, as illustrated in FIGS. 2-4, the first seating assembly 26A and the second seating assembly 26B within the vehicle interior 16 are bench-style seating assemblies 26 that have two seats that each accommodate a seated occupant. A variety of types of seating assemblies 26 are contemplated (e.g., bench seats, bucket seats, captain's chair, etc.).

Referring still to FIGS. 2-4, the seating assembly 26 of the vehicle 12 may face at least one of a variety of vehicle-directions. In some embodiments, the seating assembly 26 may face vehicle-forward. In some embodiments, the seating assembly 26 may face vehicle-laterally. A variety of vehicle-directions are contemplated (e.g., vehicle-rearward, etc.). In some embodiments, wherein the vehicle 12 includes a plurality of seating assemblies 26, one or more of the plurality of seating assemblies 26 may face a different vehicle-direction than one or more other seating assemblies 26 of the vehicle 12. In some implementations, the first seating assembly 26A may face a first vehicle-direction and the second seating assembly 26B may face a second vehicle-direction that is substantially perpendicular to the first vehicle-direction. For example, in the embodiment illustrated in FIG. 2, the first seating assembly 26A faces substantially vehicle-forward, and the second seating assembly 26B faces substantially vehicle-laterally.

Referring still to FIGS. 2-5, the seating assembly 26 of the vehicle 12 may include an armrest 32. In various embodiments, the vehicle 12 may include a plurality of armrests 32. For example, the vehicle 12 may include a first armrest 32A that corresponds with the first seating assembly 26A of the vehicle 12 and a second armrest 32B that corresponds with the second seating assembly 26B of the vehicle 12. In various embodiments, the armrest 32 of the seating assembly 26 may be in a spaced-relationship with the corresponding seating assembly 26. In other words, the armrest 32 may be not directly coupled to the seating assembly 26 with which the armrest 32 corresponds. In various embodiments, the armrest 32 may be mounted to a portion and/or component of the vehicle 12 that is in a spaced-relationship with the seating assembly 26 to which the armrest 32 corresponds. As illustrated in FIGS. 2-5, in some embodiments, the armrest 32 may be coupled to a support structure 34. In the illustrated embodiment, the support structure 34 is coupled to an interior wall 24 of the vehicle 12 at a position that is vehicle-upward of the floor 20 of the vehicle 12. In some embodiments, the support structure 34 may be coupled to at least one of the door 22 and the interior wall 24 of the vehicle 12 at a position vehicle-upward of the floor 20 of the vehicle 12. In some embodiments, the support structure 34 may be integrally coupled with at least one of the door 22 and the interior wall 24 of the vehicle 12 at a position vehicle-upward of the floor 20 of the vehicle 12. It is contemplated that the armrest 32 may be coupled to a variety of vehicle components, in various implementations.

Referring now to FIGS. 3-5 and 8-10, the support structure 34 may comprise a receptacle 36 that defines a storage area 38. In the embodiment illustrated in FIGS. 2-5, the support structure 34 includes an open-topped receptacle 36 that is coupled to the interior wall 24 of the vehicle 12. The storage area 38 of the open-topped receptacle 36 may be accessible by a user via a receptacle opening at a vehicle-upward end of the receptacle 36. As described further herein, the armrest 32 may be positioned vehicle-downward of the receptacle 36, in some embodiments.

Figure 8:
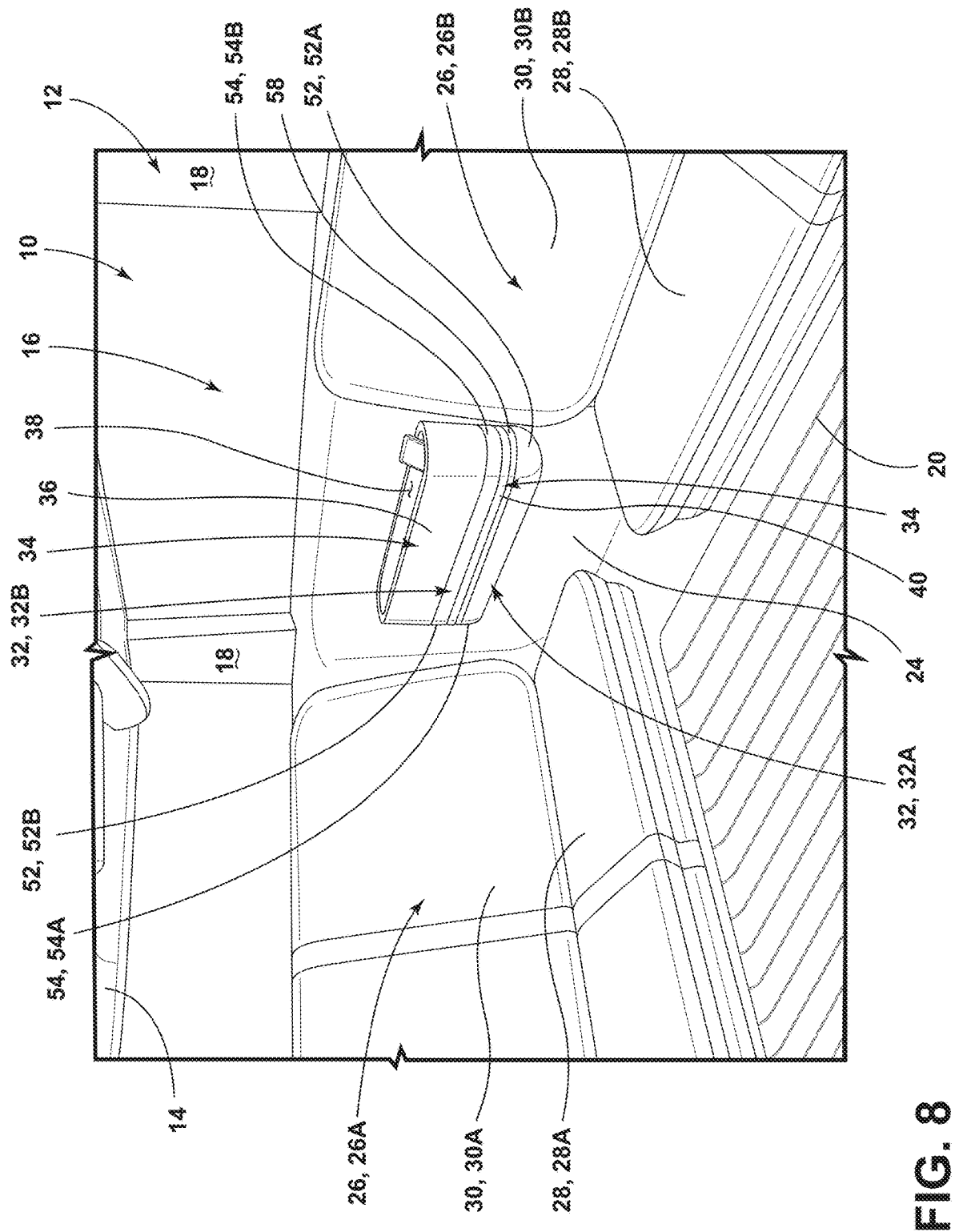
FIG. 8 is a perspective view of the vehicle interior, illustrating a first armrest in a first position and a second armrest in a stowed position, according to one embodiment.
Figure 9:
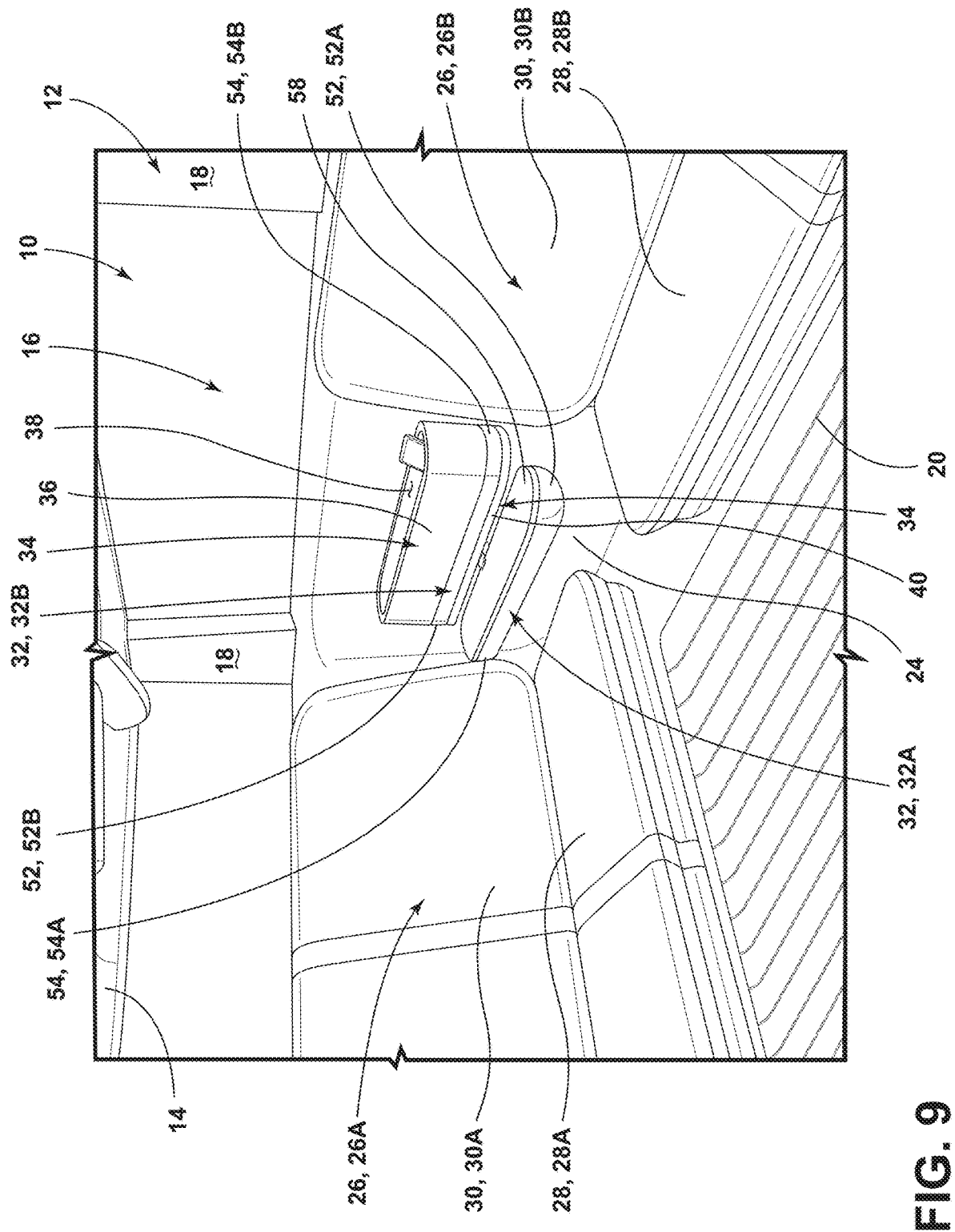
FIG. 9 is a perspective view of the vehicle interior, illustrating the first armrest in a second position and the second armrest in a stowed position, according to one embodiment.
Figure 10:
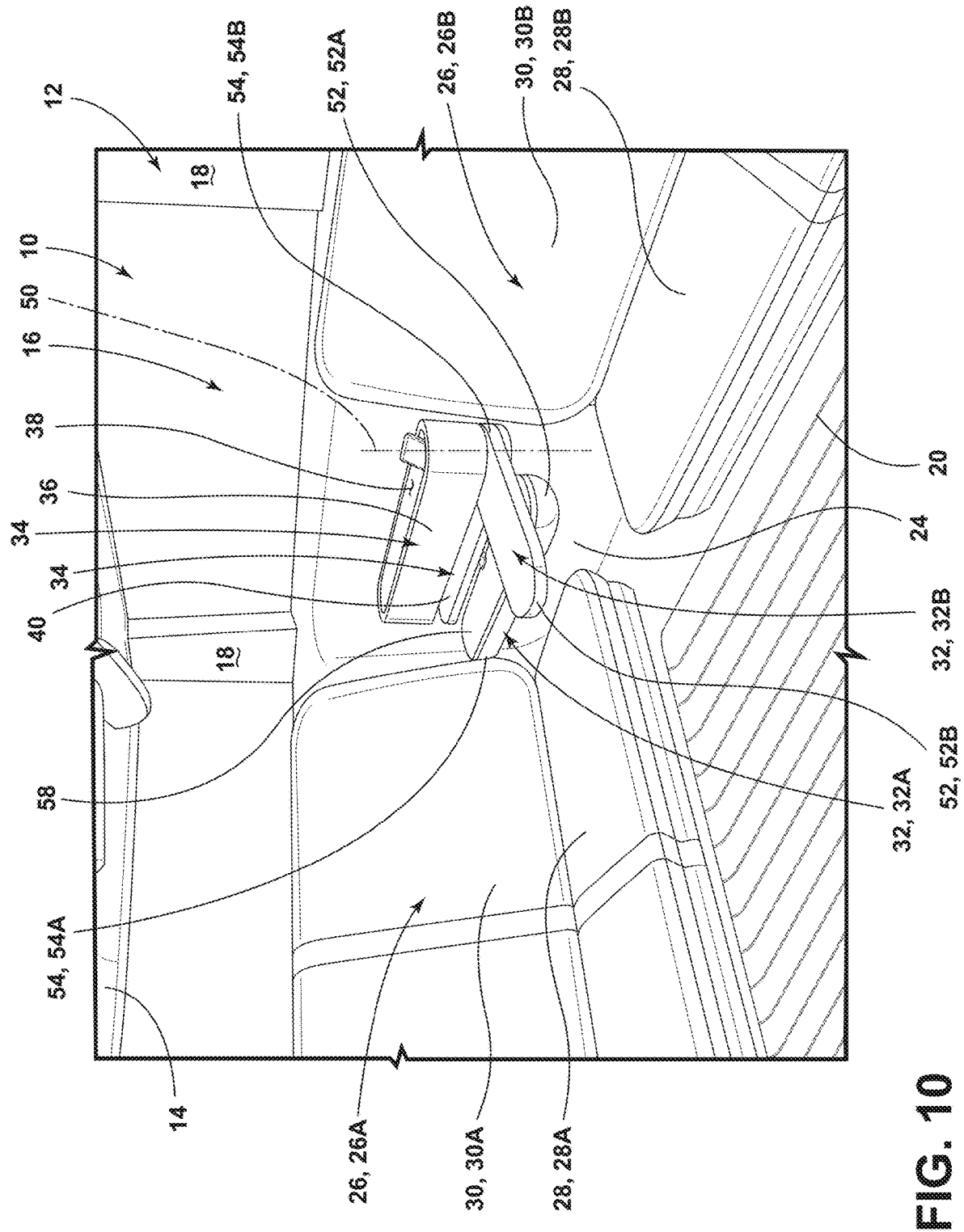
FIG. 10 is a perspective view of the vehicle interior, illustrating the first armrest in the second position and the second armrest in a use position, according to one embodiment.

In some embodiments, the support structure 34 may include a panel 40. The panel 40 may be coupled to the interior wall 24 and/or a door 22 of the vehicle 12. For example, as illustrated in FIGS. 8-10, the panel 40 is coupled to the interior wall 24 of the vehicle 12. The armrest 32 may be positioned vehicle-downward of the panel 40. In some embodiments, the armrest 32 may be positioned vehicle-upward of the panel 40. As illustrated in FIGS. 8-10, the first armrest 32A is positioned vehicle-downward of the panel 40 and the second armrest 32B is positioned vehicle-upward of the panel 40. In some embodiments, the panel 40 may be positioned beneath the receptacle 36. In other words, the panel 40 may be positioned directly vehicle-downward of the receptacle 36. For example, as illustrated in FIGS. 8-10, the panel 40 is positioned beneath the open-topped receptacle 36, the first armrest 32A is positioned vehicle-downward of the panel 40, and the second armrest 32B is positioned vehicle-upward of the panel 40 and vehicle-downward of the receptacle 36. Various types of support structures 34 are contemplated. In some embodiments, the support structure 34 may be a portion of the interior wall 24 and/or door 22 of the vehicle 12 (e.g., interior trim component, etc.). In various implementations, the support structure 34 may be an assembly of a plurality of components.

Referring now to FIGS. 3 and 4, the armrest 32 may be movably coupled to the support structure 34. In some embodiments, the armrest 32 may be translatably coupled to the support structure 34, such that the armrest 32 is operable to translate relative to the support structure 34. In various embodiments, the armrest 32 is translatable relative to the support structure 34 from a first position to a second position. For example, in the embodiment illustrated in FIGS. 3 and 4, the armrest 32 is operable to translate from the first position (FIG. 3) to the second position (FIG. 4). In some implementations, the armrest 32 is operable to translate within the vehicle 12 in seating assembly-lateral directions, relative to the seating assembly 26 with which the armrest 32 corresponds, between the first and second positions. In the embodiment illustrated in FIGS. 3 and 4, the armrest 32 corresponds with and is in a spaced-relationship with the first seating assembly 26A. The armrest 32 is operable to translate in a first seating assembly-lateral direction (i.e., seating assembly-lateral direction of the first seating assembly 26A) from the first position, wherein the armrest 32 is a first distance from the first seating assembly 26A, to the second position, wherein the armrest 32 is a second distance from the first seating assembly 26A. The first distance is greater than the second distance. In other words, the armrest 32 is nearer to the first seating assembly 26A in the second position than in the first position. In some embodiments, the armrest 32 may be operable to translate vehicle-laterally from the first position to the second position. In various embodiments, the armrest 32 translates away from the interior wall 24 and/or the door 22 that the support structure 34 is coupled to as the armrest 32 translates from the first position to the second position, as illustrated in FIGS. 3 and 4, respectively.

Referring still to FIGS. 3 and 4, in various embodiments, the armrest 32 may be positioned beneath the support structure 34 in the first position. In various embodiments, a majority of the armrest 32 is positioned beneath the support structure 34 in the first position of the armrest 32. In some embodiments, the entirety of the armrest 32 is positioned beneath the support structure 34 in the first position. In the embodiment illustrated in FIG. 3, the majority of the armrest 32 is positioned beneath the receptacle 36. In various embodiments, the armrest 32 may be positioned vehicle-downward and vehicle-inboard of the support structure 34 in the second position. In various embodiments, a majority of the armrest 32 is not positioned beneath the support structure 34 in the second position of the armrest 32. In some embodiments, the entirety of the armrest 32 is not positioned beneath the support structure 34 in the second position. In the embodiment illustrated in FIG. 4, the majority of the armrest 32 is not positioned beneath the receptacle 36.

Figure 6:
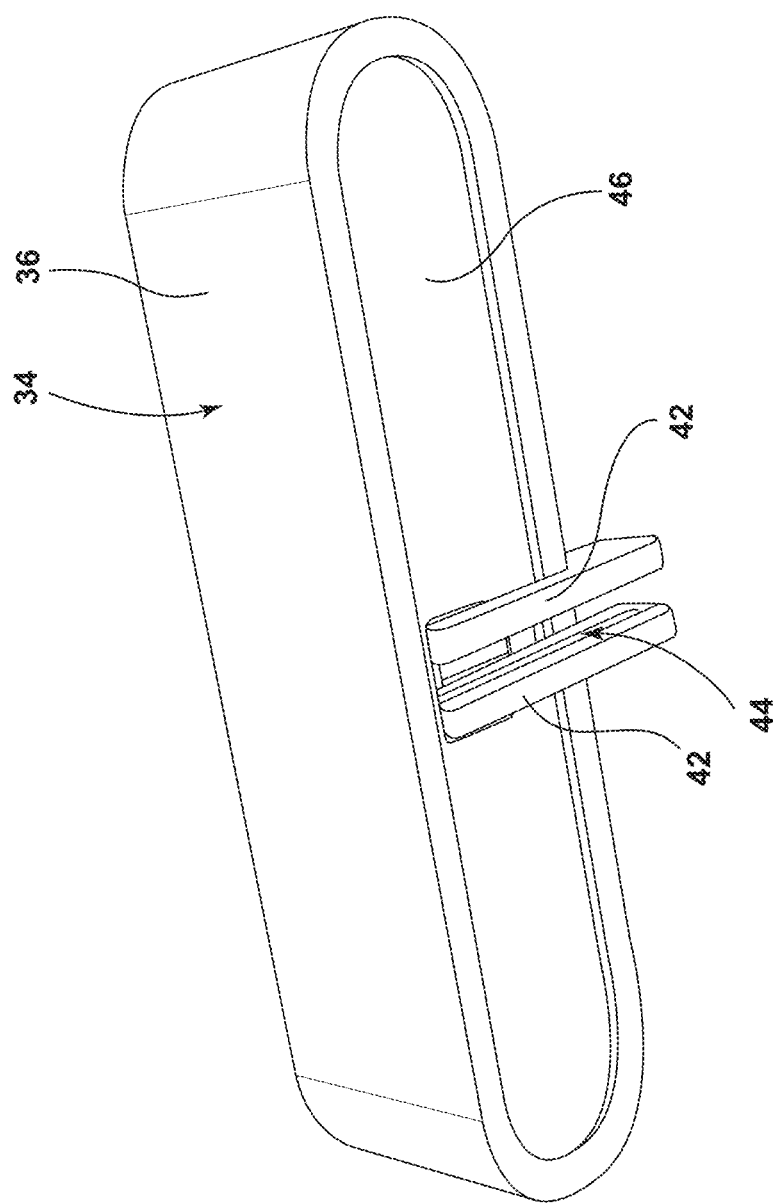
FIG. 6 is a bottom perspective view of the support structure, illustrating guide rails, according to one embodiment.
Figure 7:
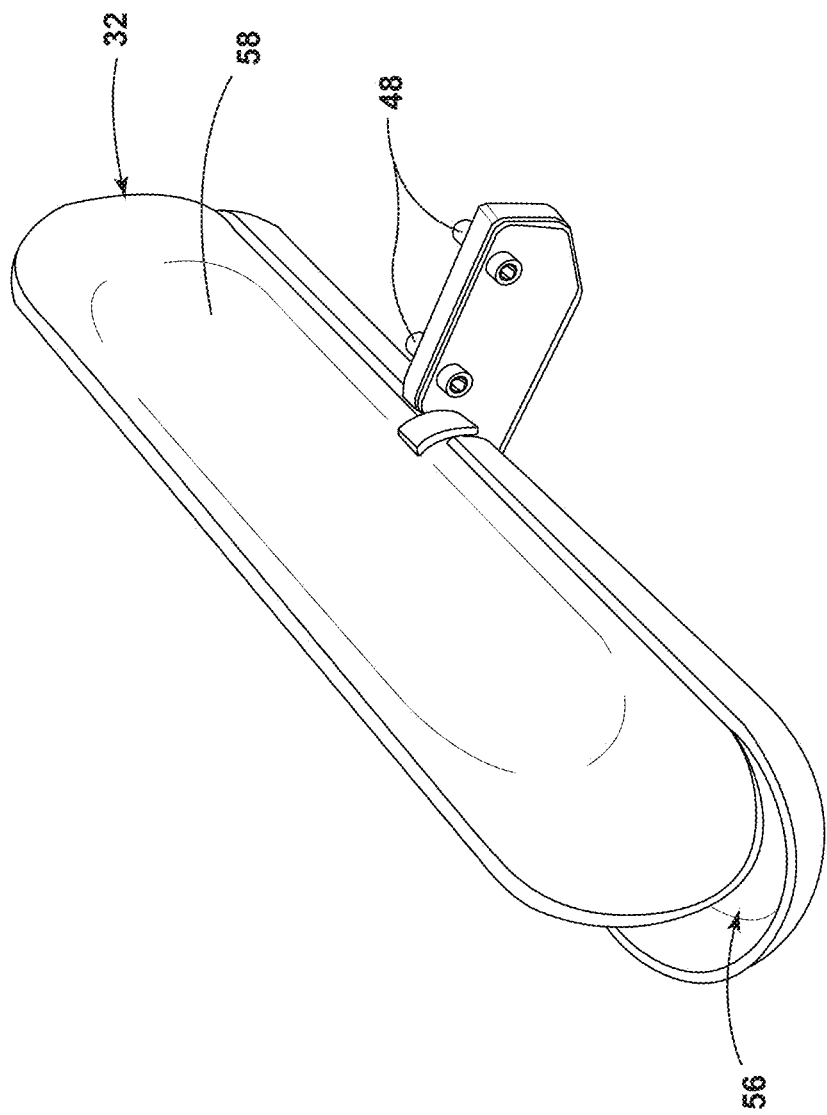
FIG. 7 is a top perspective view of the armrest, illustrating rollers configured to be engaged with the guide rails, according to one embodiment.

Referring now to FIGS. 6 and 7, the armrest 32 may be translatably coupled to the support structure 34 in a variety of fashions, in various implementations. In some embodiments, the support structure 34 may include one or more guide rails 42 that define one or more tracks 44. A portion of the armrest 32 may be configured to be engaged with the one or more tracks 44, such that the portion of the armrest 32 slides within the one or more tracks 44 to move the armrest 32 between the first and second positions. For example, as illustrated in FIG. 6, two guide rails 42 that each define a track 44 are coupled to an underside 46 of the receptacle 36. The armrest 32 illustrated in FIG. 7 includes two rollers 48 that are configured to be engaged with the tracks 44 defined by the two guide rails 42 coupled to the receptacle 36. In operation, the rollers 48 roll within the tracks 44 to allow translation of the armrest 32 between the first and second positions.

Referring now to FIGS. 8-10, in some embodiments, the armrest 32 may be in a spaced-relationship with the corresponding seating assembly 26 and operable to pivot from a stowed position to a use position. In various implementations, the armrest 32 may be pivotably coupled to the support structure 34 and pivotable relative to the support structure 34 between the stowed and use positions. In some embodiments, the armrest 32 may be pivotably coupled to at least one of the receptacle 36 and panel 40. As illustrated in FIGS. 8-10, the second armrest 32B is positioned between the panel 40 and the receptacle 36 and is pivotably coupled to both the panel 40 and the receptacle 36. As such, the second armrest 32B is operable to pivot relative to the panel 40 and the receptacle 36 from the stowed position, as illustrated in FIGS. 8 and 9, to the use position, as illustrated in FIG. 10. As illustrated in FIG. 10, in some embodiments, the armrest 32 may be operable to pivot about a substantially vehicle-vertical pivot axis 50. It is contemplated that the pivot axis 50 about which the armrest 32 pivots may extend in various vehicle-directions, in some embodiments.

Referring still to FIGS. 8-10, the armrest 32 may be positioned beneath at least a portion of the support structure 34 in the stowed position. In various embodiments, a majority of the armrest 32 is positioned beneath at least a portion of the support structure 34 in the stowed position of the armrest 32. In some embodiments, the entirety of the armrest 32 is positioned beneath at least a portion of the support structure 34 in the stowed position. In the embodiment illustrated in FIG. 8, the majority of the second armrest 32B is positioned beneath the receptacle 36 in the stowed position. The armrest 32 may be positioned above (i.e., directly vehicle-upward of) at least a portion of the support structure 34 in the stowed position. In various embodiments, a majority of the armrest 32 is positioned above at least a portion of the support structure 34 in the stowed position of the armrest 32. In some embodiments, the entirety of the armrest 32 is positioned above at least a portion of the support structure 34 in the stowed position. In the embodiment illustrated in FIG. 8, the majority of the second armrest 32B is positioned above the panel 40 in the stowed position. In various embodiments, a majority of the armrest 32 is not positioned above or beneath the support structure 34 in the use position of the armrest 32. In the embodiment illustrated in FIG. 10, wherein the second armrest 32B is in the use position, the majority of the second armrest 32B is positioned neither beneath the receptacle 36 nor above the panel 40.

Referring still to FIGS. 8-10, the interior system 10 of the vehicle 12 may include the first armrest 32A that corresponds with the first seating assembly 26A and that is translatably coupled to the support structure 34, and the second armrest 32B that corresponds with the second seating assembly 26B and that is pivotably coupled to the support structure 34. The first armrest 32A may be operable to translate in the first seating assembly-lateral direction from the first position toward the second position, and the second armrest 32B may be operable to pivot from the stowed position to the use position about the pivot axis 50. In some embodiments, a majority of the first armrest 32A may be positioned beneath the second armrest 32B in a condition of the interior system 10, wherein the first armrest 32A is in the first position and the second armrest 32B is in the stowed position. For example, in the embodiment illustrated in FIG. 8, wherein the first armrest 32A is in the first position and the second armrest 32B is in the stowed position, the majority of the first armrest 32A is positioned beneath the second armrest 32B. In some embodiments, wherein the support structure 34 includes the receptacle 36, the second armrest 32B may be positioned beneath the receptacle 36 and the first armrest 32A may be positioned beneath the receptacle 36 and beneath the second armrest 32A in a condition of interior system 10, wherein the first armrest 32A is in the first position and the second armrest 32B is in the stowed position.

In the embodiment illustrated in FIGS. 8-10, the support structure 34 includes the open-topped receptacle 36 that is coupled to the interior wall 24 and in a spaced-relationship with the floor 20 and roof 14 of the vehicle 12. The support structure 34 further includes the panel 40 that is coupled to the interior wall 24 and positioned beneath the receptacle 36. The first armrest 32A is translatably coupled to an underside of the panel 40 and operable to translate in a first seating assembly-lateral direction from the first position, wherein the first armrest 32A is positioned beneath the panel 40, as illustrated in FIG. 8, to a second position, wherein the first armrest 32A is nearer to the first seating assembly 26A, as illustrated in FIGS. 9 and 10. The second armrest 32B is pivotably coupled to the support structure 34 between the panel 40 and the receptacle 36. The second armrest 32B is operable to pivot about the substantially vehicle-vertical pivot axis 50 from the stowed position, wherein a majority of the second armrest 32B is positioned beneath the receptacle 36 and above the panel 40, as illustrated in FIGS. 8 and 9, to the use position, as illustrated in FIG. 10.

Referring now to FIGS. 3 and 4, the armrest 32 may include a distal end 52 and a proximal end 54. In various embodiments, the armrest 32 may extend along a length of the armrest 32 (i.e., in a lengthwise direction) between the proximal and distal ends 54, 52 of the armrest 32. In some embodiments, the armrest 32 may extend from the armrest proximal end 54 to the armrest distal end 52 away from the seatback 30 of the seating assembly 26 with which the armrest 32 corresponds. For example, as illustrated in FIGS. 3 and 4, proximal end 54 of the armrest 32 is nearer than the distal end 52 of the armrest 32 to the seatback 30 of the first seating assembly 26A with which the armrest 32 corresponds. As such, the armrest 32 extends from the armrest proximal end 54 to the armrest distal end 52 away from the seatback 30 of the first seating assembly 26A. In some embodiments, the length of armrest 32 (i.e., lengthwise direction) may be substantially perpendicular to the seating assembly-lateral direction of the seating assembly 26 with which the armrest 32 corresponds. For example, in the embodiment illustrated in FIG. 4, the length of the armrest 32, which is substantially vehicle-longitudinal (i.e., substantially parallel to a vehicle-longitudinal centerline 62 of the vehicle 12), is substantially perpendicular with the first seating assembly-lateral direction, which is substantially vehicle-lateral.

In the embodiment illustrated in FIGS. 8-10, the vehicle interior system 10 includes the first seating assembly 26A, the first armrest 32A that corresponds with the first seating assembly 26A, the second seating assembly 26B, and the second armrest 32B that corresponds with the second seating assembly 26B. The first armrest 32A extends along its length from a first armrest proximal end 54A to a first armrest distal end 52A. The second armrest 32B extends along its length from a second armrest proximal end 54B to a second armrest distal end 52B. In both the first and second positions of the first armrest 32A, the length of the first armrest 32A extends substantially perpendicular to the first seating assembly-lateral direction and to the direction of translation of the first armrest 32A between the first and second positions. The second armrest 32B extends along its length from the second armrest proximal end 54B to the second armrest distal end 52B away from the second seatback 30B of the second seating assembly 26B. The length of the second armrest 32B is substantially parallel to the second seating assembly-lateral direction in the stowed position of the second armrest 32B, as illustrated in FIGS. 8 and 9. The length of the second armrest 32B is substantially perpendicular to the second seating assembly-lateral direction in the use position of the second armrest 32B, as illustrated in FIG. 10. As illustrated in FIGS. 8 and 9, the length of the first armrest 32A is substantially parallel to the length of the second armrest 32B in the stowed position of the second armrest 32B. In various embodiments, the length of the first armrest 32A is substantially perpendicular to the length of the second armrest 32B in the use position of the second armrest 32B, as illustrated in FIG. 10.

Figure 5:
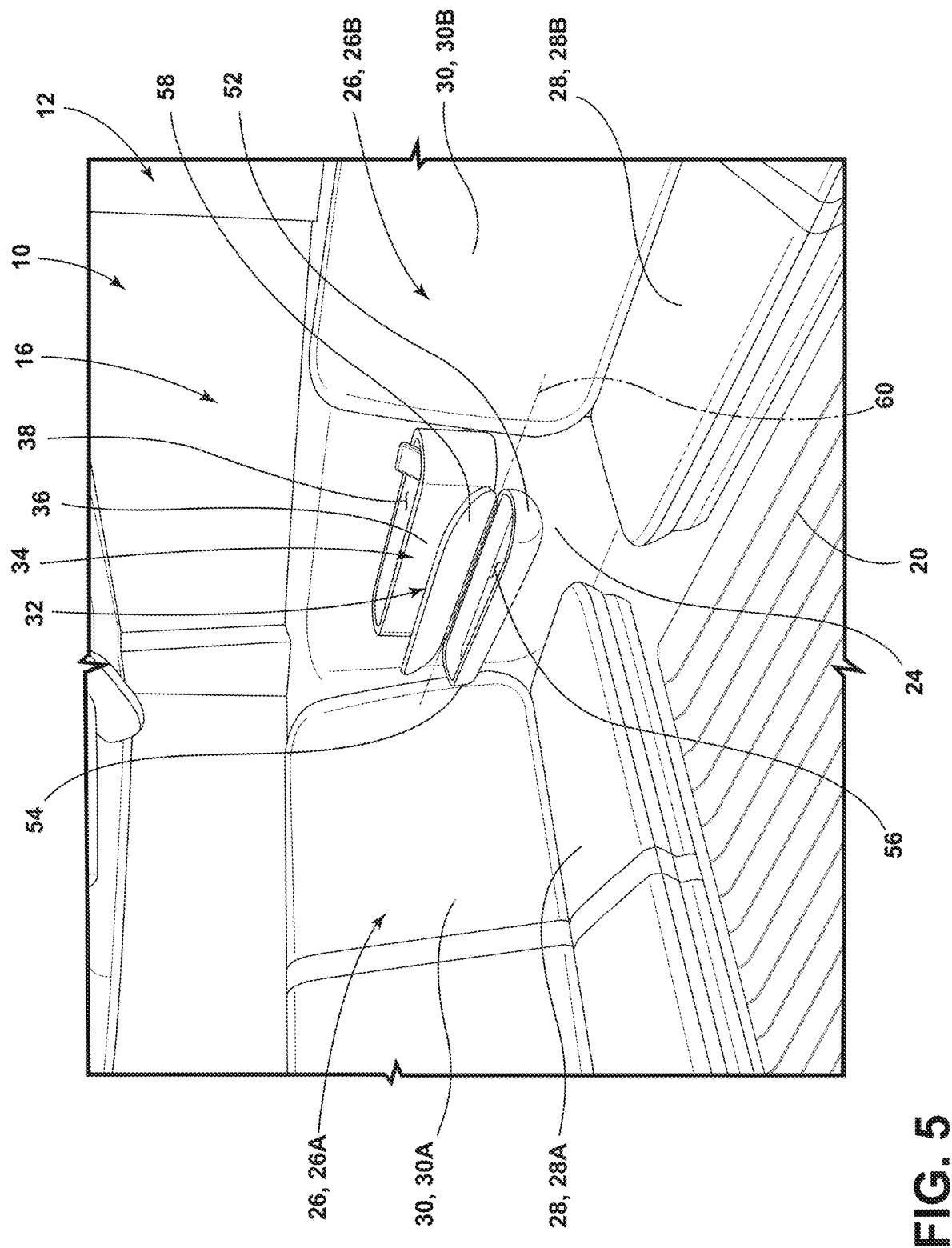
FIG. 5 is a perspective view of the vehicle interior, illustrating a lid of the armrest in an open position and a storage compartment of the armrest, according to one embodiment.

Referring now to FIGS. 3-5, in some embodiments, the armrest 32 may include a storage compartment 56. The armrest 32 may further include a lid 58 that is operably coupled to the storage compartment 56. The lid 58 may be movable between an open position, wherein access to the storage compartment 56 is provided, and a closed position, wherein the lid 58 covers an opening to the storage compartment 56. In some embodiments, the lid 58 may be pivotable between the open and closed positions about a lid pivot axis 60. The lid pivot axis 60 may extend in a substantially seating assembly-longitudinal direction of the seating assembly 26 with which the armrest 32 corresponds. For example, as illustrated in FIG. 5, the lid pivot axis 60 extends in a direction that is substantially parallel to the seating assembly-longitudinal direction of the first seating assembly 26A. In some embodiments, in the closed position of the lid 58 and the second position of the armrest 32, the lid 58 may provide a resting surface for the arm of a user utilizing the armrest 32. In some implementations, the support structure 34, to which the armrest 32 is translatably coupled, may interfere with a pivot path of the lid 58 from the closed position to the open position, in the first position of the armrest 32. For example, as illustrated in FIG. 3, the armrest 32 is positioned beneath the support structure 34 in the first position, such that the lid 58 is generally prevented from pivoting vehicle-upward from the closed position to the open position. Movement of the armrest 32 out from beneath the support structure 34 to the second position may allow the lid 58 to pivot to the open position, as illustrated in FIG. 5.

In an exemplary embodiment of the interior system 10 of the vehicle 12, first and second seating assemblies 26A, 26B are positioned within the vehicle 12, as illustrated in FIGS. 8-10. The first seating assembly 26A faces substantially vehicle-forward, and the second seating assembly 26B faces substantially vehicle-laterally. The first and second armrests 32A, 32B are operably coupled to the support structure 34, which is mounted to the interior wall 24 of the vehicle 12. In operation of the exemplary embodiment, a first user may sit in the first seating assembly 26A and, desiring to utilize the corresponding first armrest 32A, translates the first armrest 32A from the first position, as illustrated in FIG. 8, to the second position, as illustrated in FIG. 9. A second user enters the vehicle 12 and sits in the second seating assembly 26B. Desiring to utilize the second armrest 32B, the second user pivots the second armrest 32B from the stowed position, as illustrated in FIG. 9, to the use position, as illustrated in FIG. 10. In this configuration, both the first and second users have access to the first and second armrests 32A, 32B, respectively.

The interior system 10 described herein may provide a variety of advantages. First, the storage compartment 56 of the first armrest 32A may provide a storage area for items, such as a pair of sunglasses. Second, the first and/or second armrests 32A, 32B being positioned beneath the support structure 34 in the first position and/or the stowed position may contribute to a sleek, spacious aesthetic within the vehicle interior 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An interior system for a vehicle, comprising:
a seating assembly coupled to the vehicle; and
an armrest corresponding with and in a spaced-relationship with the seating assembly and operable to translate in a seating assembly-lateral direction from a first position, wherein the armrest is a first distance from the seating assembly, to a second position, wherein the armrest is a second distance from the seating assembly, wherein the first distance is greater than the second distance.

2. The interior system of claim 1, further comprising:
a support structure coupled to at least one of a door of the vehicle and an interior wall of the vehicle at a position vehicle-upward of a floor of the vehicle, wherein the armrest is translatably coupled to the support structure and operable to translate relative to the support structure between the first and second positions.

3. The interior system of claim 2, wherein the support structure comprises:
a receptacle that defines a storage area.

4. The interior system of claim 3, wherein the armrest is positioned beneath the receptacle in the first position.

5. The interior system of claim 4, wherein the armrest comprises:
a storage compartment; and
a lid operably coupled to the storage compartment and pivotable between an open position, wherein access to the storage compartment is provided, and a closed position, wherein the lid covers an opening to the storage compartment.

6. The interior system of claim 5, wherein the support structure interferes with a pivot path of the lid in the first position of the armrest.

7. The interior system of claim 5, wherein the lid is operable to pivot between the open and closed positions about a lid pivot axis that extends substantially seating assembly-longitudinally.

8. An interior system for a vehicle, comprising:
a first seating assembly coupled to the vehicle;
a second seating assembly coupled to the vehicle;
a first armrest corresponding with and in a spaced-relationship with the first seating assembly and operable to translate in a first seating assembly-lateral direction from a first position, wherein the armrest is a first distance from the first seating assembly, to a second position, wherein the armrest is a second distance from the first seating assembly, wherein the first distance is greater than the second distance; and
a second armrest corresponding with and in a spaced-relationship with the second seating assembly and operable to pivot from a stowed position to a use position about a substantially vehicle-vertical pivot axis.

9. The interior system of claim 8, wherein a majority of the first armrest is positioned beneath the second armrest in a condition of the interior system, wherein the first armrest is in the first position and the second armrest is in the stowed position.

10. The interior system of claim 8, wherein the first armrest comprises:
a first armrest distal end; and
a first armrest proximal end, wherein the first armrest extends from the first armrest proximal end to the first armrest distal end away from a first seatback of the first seating assembly along a length of the first armrest that is substantially perpendicular to the first seating assembly-lateral direction.

11. The interior system of claim 10, wherein the second armrest comprises:
a second armrest distal end; and
a second armrest proximal end, wherein the second armrest extends from the second armrest proximal end to the second armrest distal end away from a second seatback of the second seating assembly along a length of the second armrest, wherein the length of the second armrest is substantially parallel to a second seating assembly-lateral direction in the stowed position of the second armrest, and the length of the second armrest is substantially perpendicular to the second seating assembly-lateral direction in the use position of the second armrest.

12. The interior system of claim 11, wherein the length of the first armrest is substantially parallel to the length of the second armrest in the stowed position of the second armrest.

13. The interior system of claim 8, wherein the first seating assembly faces a first vehicle-direction, the second seating assembly faces a second vehicle-direction, and the first vehicle-direction is substantially perpendicular to the second vehicle-direction.

14. The interior system of claim 8, further comprising:
a receptacle positioned within the vehicle, such that, in a condition of the interior system wherein the first armrest is in the first position and the second armrest is in the stowed position, the second armrest is positioned beneath the receptacle and the first armrest is positioned beneath the receptacle and the second armrest.

15. The interior system of claim 8, wherein the first armrest comprises:
a storage compartment; and
a lid operably coupled to the storage compartment and pivotable between an open position, wherein access to the storage compartment is provided, and a closed position, wherein the lid covers an opening to the storage compartment.

16. The interior system of claim 15, further comprising:
a support structure coupled to the vehicle, wherein the first armrest is translatably coupled to the support structure, and the support structure interferes with a pivot path of the lid in the first position of the first armrest.

17. An interior system for a vehicle, comprising:
a support structure coupled to at least one of a door of the vehicle and an interior wall of the vehicle at a position vehicle-upward of a floor of the vehicle; and
an armrest in a spaced-relationship with a corresponding seating assembly of the vehicle, translatably coupled to the support structure, and operable to translate relative to the support structure from a first position, wherein the armrest is positioned beneath the support structure, to a second position.

18. The interior system of claim 17, wherein the armrest translates in a seating assembly-lateral direction from the first position to the second position.

19. The interior system of claim 18, wherein the armrest is a first distance from the seating assembly in the first position and a second distance from the seating assembly in the second position, and wherein the first distance is greater than the second distance.

20. The interior system of claim 17, wherein the support structure comprises:
an open-topped receptacle.

* * * * *